US009432752B2

United States Patent
Tanaka et al.

(10) Patent No.: US 9,432,752 B2
(45) Date of Patent: Aug. 30, 2016

(54) OPTICAL TRANSMISSION SYSTEM

(71) Applicant: Hitachi, Ltd., Chiyoda-ku, Tokyo (JP)

(72) Inventors: Kenichi Tanaka, Tokyo (JP); Yong Lee, Tokyo (JP); Masanao Yamaoka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/558,802

(22) Filed: Dec. 3, 2014

(65) Prior Publication Data

US 2015/0156569 A1 Jun. 4, 2015

(30) Foreign Application Priority Data

Dec. 3, 2013 (JP) .................... 2013-250483

(51) Int. Cl.
| | |
|---|---|
| H04J 14/02 | (2006.01) |
| H04J 14/04 | (2006.01) |
| H04B 10/20 | (2006.01) |
| H04Q 11/00 | (2006.01) |
| H04B 10/275 | (2013.01) |
| H04B 10/032 | (2013.01) |

(52) U.S. Cl.
CPC ........ *H04Q 11/0005* (2013.01); *H04B 10/032* (2013.01); *H04B 10/275* (2013.01); *H04Q 11/0062* (2013.01); *H04J 14/0283* (2013.01); *H04Q 2011/0052* (2013.01); *H04Q 2011/0081* (2013.01)

(58) Field of Classification Search
CPC ......... H04Q 11/0005; H04Q 11/0062; H04Q 11/00; H04Q 2011/0052; H04B 10/25; H04B 10/275; H04B 10/032; H04J 14/02
USPC .................... 398/48, 45, 83, 59, 79
See application file for complete search history.

(56) References Cited

U.S. PATENT DOCUMENTS

| | | | | |
|---|---|---|---|---|
| 6,005,694 A * | 12/1999 | Liu | ...................... | H04B 10/071 398/20 |
| 6,822,972 B1 * | 11/2004 | Farhan | ................. | H04B 10/275 348/E7.07 |
| 7,158,478 B1 * | 1/2007 | Mazzurco | .......... | H04J 14/0227 370/222 |
| 7,158,720 B1 * | 1/2007 | Mazzurco | .......... | H04J 14/0283 398/3 |
| 7,643,751 B2 * | 1/2010 | Sone | ................... | H04J 14/0204 398/4 |
| 7,650,075 B2 * | 1/2010 | Kikuchi | ............. | H04J 14/0206 398/33 |
| 7,660,330 B1 * | 2/2010 | Shmilovici | .......... | H04J 3/0688 370/503 |
| 7,986,619 B2 * | 7/2011 | Sugawara | .......... | H04L 12/4637 370/222 |
| 8,000,232 B2 * | 8/2011 | Fujimori | ................. | H04J 3/085 340/2.9 |
| 8,139,476 B2 * | 3/2012 | Way | ......................... | H04J 3/14 370/217 |
| 8,724,518 B2 * | 5/2014 | Ogasahara | ........... | H04L 12/413 370/258 |

(Continued)

FOREIGN PATENT DOCUMENTS

WO    WO 2007/018164 A1    2/2007

*Primary Examiner* — Ken N Vanderpuye
*Assistant Examiner* — Abbas H Alagheband
(74) *Attorney, Agent, or Firm* — Crowell & Moring LLP

(57) ABSTRACT

In an optical transmission system including at least one ring network configured by plural nodes, each node of the ring network is provided with the optical switch having connection configuration that the output in at least two directions of a signal input to the node is allowed and the output of the optical switch functions as input to another node included in the plural nodes.

2 Claims, 21 Drawing Sheets

(56) References Cited

U.S. PATENT DOCUMENTS

| | | | | |
|---|---|---|---|---|
| 8,948,593 B2* | 2/2015 | Ooi | H04J 14/022 | 398/59 |
| 2002/0105693 A1* | 8/2002 | Kobayashi | H04B 10/032 | 398/4 |
| 2002/0196495 A1* | 12/2002 | Grasso | H04J 14/0206 | 398/82 |
| 2004/0052520 A1* | 3/2004 | Halgren | H04J 14/0227 | 398/5 |
| 2004/0052530 A1* | 3/2004 | Tian | H04J 14/0204 | 398/83 |
| 2004/0114922 A1* | 6/2004 | Hardee | H04L 41/06 | 398/17 |
| 2005/0025490 A1* | 2/2005 | Aoki | H04J 14/0204 | 398/85 |
| 2006/0171717 A1* | 8/2006 | Kikuchi | H04J 14/0206 | 398/83 |
| 2006/0222360 A1* | 10/2006 | Gumaste | H04B 10/032 | 398/5 |
| 2007/0086332 A1* | 4/2007 | Way | H04J 3/14 | 370/223 |
| 2007/0264011 A1* | 11/2007 | Sone | H04J 14/0204 | 398/10 |
| 2007/0292128 A1* | 12/2007 | Fang | H04J 14/0201 | 398/4 |
| 2008/0285440 A1* | 11/2008 | Adler | H04J 3/14 | 370/223 |
| 2009/0003199 A1* | 1/2009 | Sugawara | H04J 3/14 | 370/223 |
| 2009/0135717 A1* | 5/2009 | Kamal | H04J 3/14 | 370/225 |
| 2010/0158002 A1* | 6/2010 | Ogasahara | H04L 45/00 | 370/392 |
| 2011/0135301 A1* | 6/2011 | Myslinski | H04B 10/572 | 398/34 |
| 2012/0082454 A1* | 4/2012 | Ooi | H04J 14/022 | 398/49 |
| 2012/0287776 A1* | 11/2012 | Inaba | H04L 45/22 | 370/217 |
| 2013/0259473 A1* | 10/2013 | Fujii | H04J 14/02 | 398/48 |
| 2015/0156569 A1* | 6/2015 | Tanaka | H04Q 11/0005 | 398/45 |

\* cited by examiner

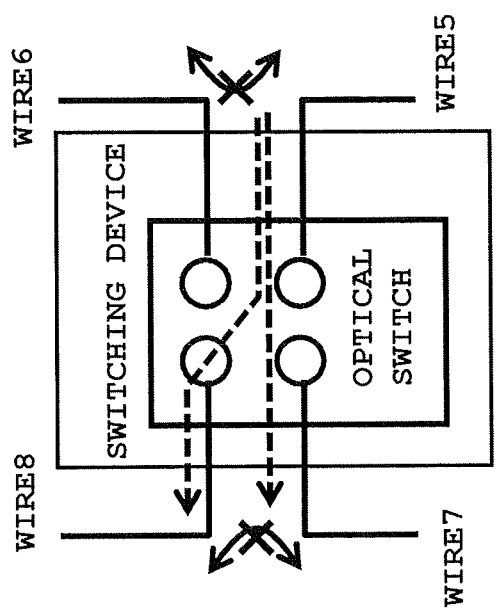

FIG.2

| | OPTICAL SW TRANSIT ORDER | | | | SW TRANSIT FREQUENCY |
|---|---|---|---|---|---|
| | ① | ② | ③ | ④ | |
| C (IN NORMAL OPERATION) | C-SW | F | C | — | THREE TIMES |
| ALTERNATIVE ROUTE (SW SCALE IS SMALL) | C-SW | D | A | C | FOUR TIMES |

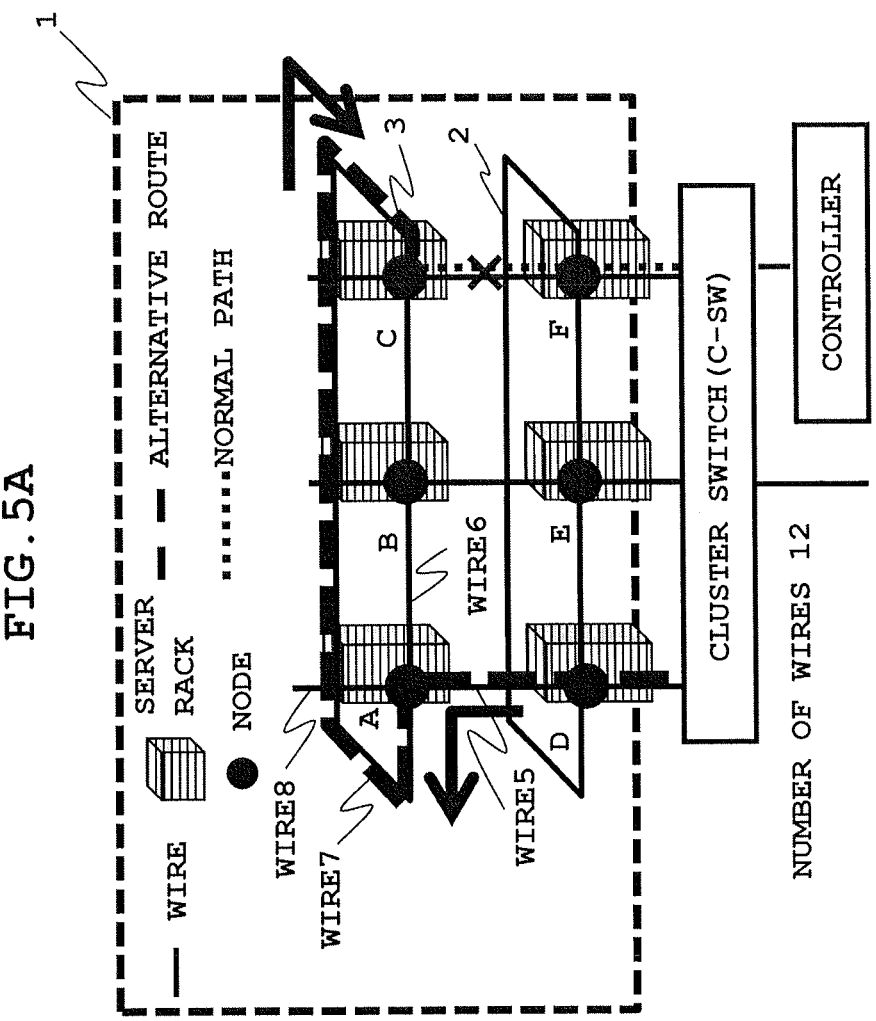

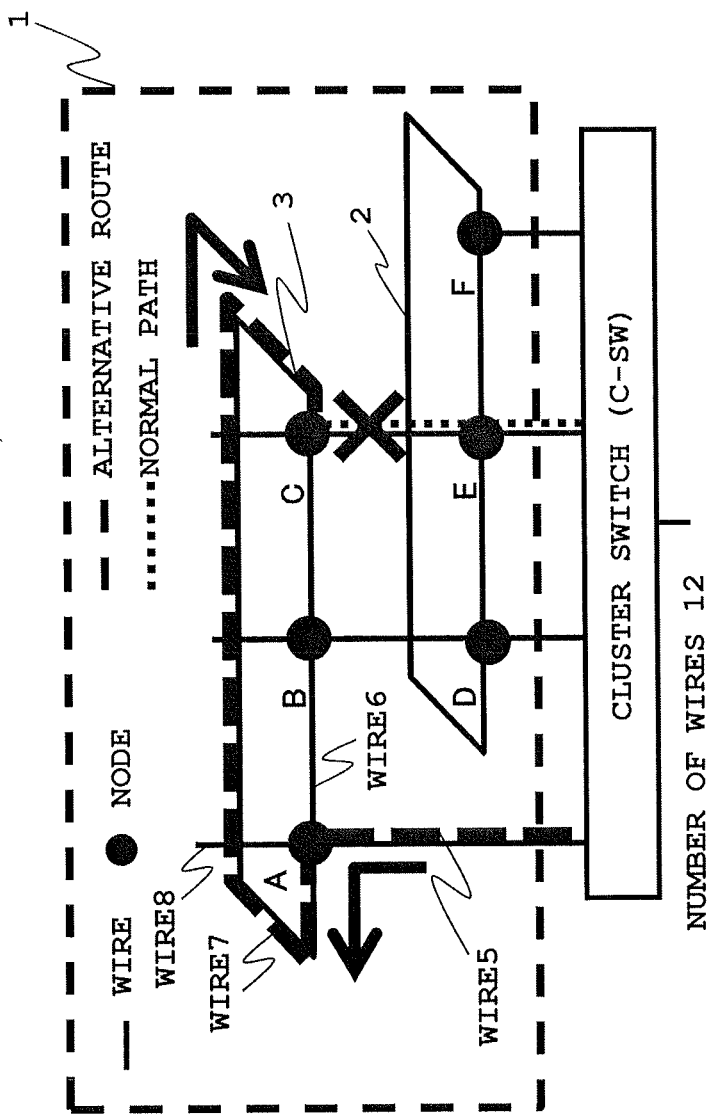

FIG.7

| | OPTICAL SW TRANSIT ORDER | | | SW TRANSIT FREQUENCY |
|---|---|---|---|---|
| | ① | ② | ③ | |
| C (IN NORMAL OPERATION) | C-SW | E | C | THREE TIMES |
| ALTERNATIVE ROUTE (SW SCALE IS SMALL) | C-SW | A | C | THREE TIMES |

FIG. 9

| | OPTICAL SW TRANSIT ORDER | | | | | | SW TRANSIT FREQUENCY |
|---|---|---|---|---|---|---|---|
| | ① | ② | ③ | ④ | ⑤ | ⑥ | |
| 10 (IN NORMAL OPERATION) | C-SW | 25 | 20 | 15 | 10 | | FIVE TIMES |
| ALTERNATIVE ROUTE 1 | C-SW | 26 | 21 | 16 | 11 | 10 | SIX TIMES |
| ALTERNATIVE ROUTE 2 | C-SW | 7 | 12 | 11 | 10 | | FIVE TIMES |

FIG.10

| | OPTICAL SW TRANSIT ORDER | | | | | | SW TRANSIT FREQUENCY |
|---|---|---|---|---|---|---|---|
| | ① | ② | ③ | ④ | ⑤ | ⑥ | |
| 11 (IN NORMAL OPERATION) | C-SW | 26 | 21 | 16 | 11 | | FIVE TIMES |
| ALTERNATIVE ROUTE 1 | C-SW | 27 | 22 | 17 | 12 | 11 | SIX TIMES |
| ALTERNATIVE ROUTE 2 | C-SW | 7 | 12 | 11 | | | FOUR TIMES |

FIG.12

| | OPTICAL SW TRANSIT ORDER | | | | | | SW TRANSIT FREQUENCY |
|---|---|---|---|---|---|---|---|
| | ① | ② | ③ | ④ | ⑤ | ⑥ | |
| 10 (IN NORMAL OPERATION) | C-SW | 28 | 22 | 16 | 10 | | FIVE TIMES |
| ALTERNATIVE ROUTE (SW SCALE IS SMALL) | C-SW | 29 | 23 | 17 | 11 | 10 | SIX TIMES |

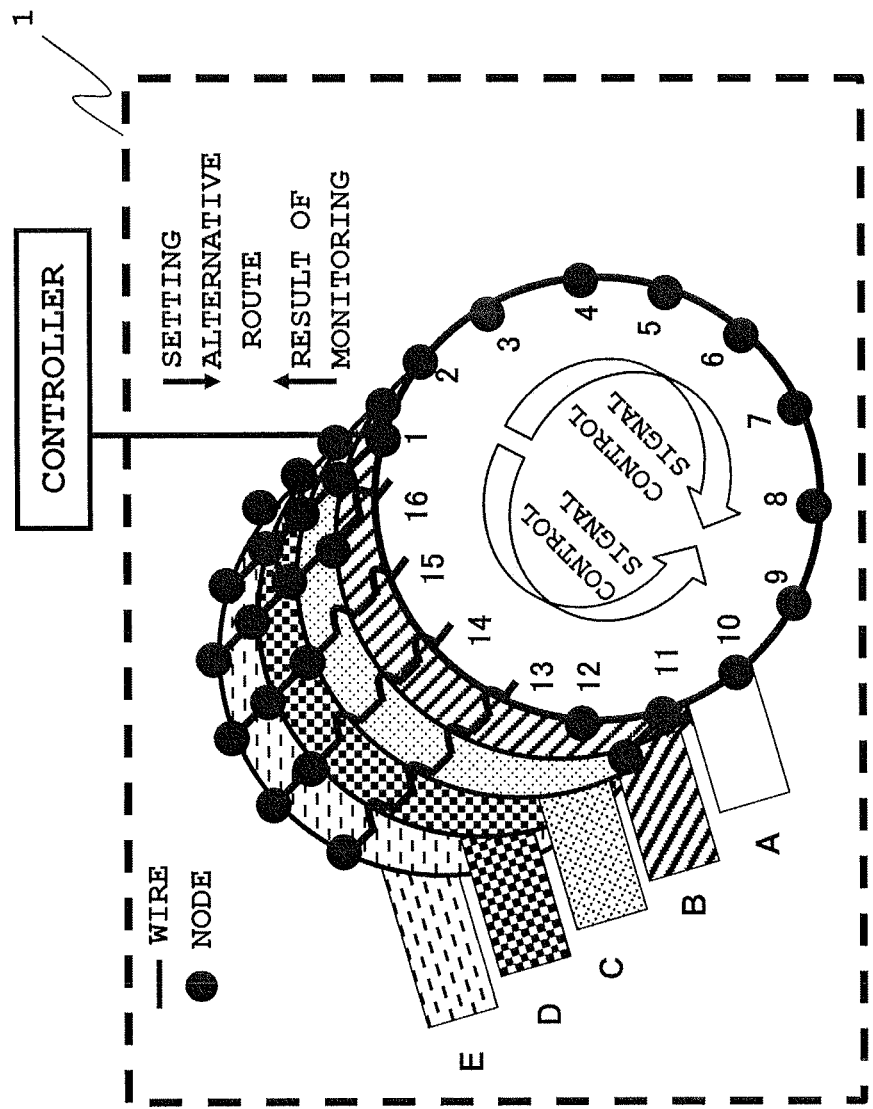

FIG. 15C

| | OPTICAL SW TRANSIT ORDER | | | | SW TRANSIT FREQUENCY |
|---|---|---|---|---|---|
| | ① | ② | ③ | ④ | |
| C (IN NORMAL OPERATION) | C-SW | F | C | — | THREE TIMES |
| ALTERNATIVE ROUTE (SW SCALE IS SMALL) | C-SW | E | B | C | FOUR TIMES |

PRIOR ART

OPTICAL TRANSMISSION SYSTEM

INCORPORATION BY REFERENCE

This application claims priority of Japanese patent application No. 2013-250483 filed on Dec. 3, 2013, the entire contents of which are incorporated herein by reference.

FIELD OF THE INVENTION

The present invention relates to an optical transmission system that suppresses the expansion of the scale of an optical switch matrix of each node and the increase of the number of links, and secures an alternative route in which the number of passed nodes is optimized in an optical transmission network. A path including an active signal line and plural alternative routes including preliminary signal lines exist in one or plural ring networks configured by plural nodes each of which has an optical switch. Switching to the alternative route is performed when the active signal line is unavailable.

BACKGROUND OF THE INVENTION

As a result of broadened optical fiber communication, low-priced communication of mass digital information is enabled. New service that applies mass digital information further promotes broadened communication, and the traffic of the Internet grows at a high rate, approximately doubling in two years. An optical fiber network where mass data is communicated at high speed over a relatively long distance of several km, with a basic trunk, a metropolitan area network, and an access line cover, has been developed. Optical link technology that uses optical linking is also effective in extremely short distances between information communication (ICT) devices, such as a server in a data center (several meters to several hundreds of meters), or in the information communication device (several to several tens of centimeters).

For network topology with plural nodes connected via an optical fiber, a transmission network has been configured in a complex combination of a linear chain network, a mesh network, a ring network, a multi-ring network, and a standby line access network, as well as in a point-to-point network, which is the most simple. In such complex transmission networks, it is estimated that damage when failure occurs in a transmission line because of disaster and disconnection is inscrutable. Now, therefore, a network configured to maintain required communication in a sudden change of communication environment, such as the suspension of a network in a disaster, and others, is demanded. A mesh network is a representative example of a network in which plural transmission paths exist based upon the abovementioned background. In a mesh network, when an active signal line is unavailable, switching to an alternative route is performed, and, at the time of disaster, a secure transmission path is also enabled.

The mesh network is configured so that a signal input to each node is output in at least three directions to secure an alternative route, and the scale of a matrix in an optical switch for switching paths increases. In an optical switch in which the scale of the matrix increases as described above, loss increases because the number of interfering paths for switching paths increases. The number of cross points between waveguides also increases in the case of a waveguide type. When such an optical switch is a mechanical type, an operational range widens, and loss increases by the quantity of an operational error as the scale of the matrix increases. In the meantime, in the optical switch in which the scale of the matrix increases, as the number of ports increases, the number of wires increases. The reason is that plural wires are prepared every time a network is increased, and as an installation cost greatly increases, the optical switch has poor scalability and a huge cost is required for the restoration of a transmission network. Moreover, when the alternative route is long, transit in the optical switch is frequent and loss applied to a transmitted signal by the optical switch also increases.

For a transmission network in which the securement of plural paths between different nodes is enabled, a transmission network configured by plural rings, each of which is acquired by connecting ends of the mesh network, is well-known (for example, refer to International Publication WO 2007/018164).

SUMMARY OF THE INVENTION

Accordingly, a transmission network where a low-loss and general purpose optical switch is used for an optical switch of each node, and switching to a preliminary signal line is also enabled in the optical switch, in which the scale of a matrix is inhibited when the transmission of a signal in an active signal line turns impossible, is being researched. In such a transmission network, it is demanded that, concretely, the following three requirements be met. The first requirement is that securing plural paths between different nodes is enabled. The second requirement is that the scale of the matrix in the optical switch located in each node be minimized. The third requirement is that an alternative route switched to, when the active path turns impossible, is required to be a route in which the number of passed nodes is inhibited, to inhibit a passage count.

The network of International Publication WO 2007/018164 can meet the first requirement, because securing plural paths between different nodes is enabled.

Referring to FIGS. 15A to 15C, the second and third requirements in the International Publication WO 2007/018164 will be described below. As shown in FIG. 15A, a path from a cluster switch to a node C in normal operation is a path via a node F. At this time, when a link between the node C and the node F is disconnected, one of the alternative routes from the cluster switch to the node C is a route via a node E and a node B. Accordingly, the scale of a matrix in an optical switch provided to the node B is as shown in FIG. 15B. That is, as the configuration disclosed in the International Publication WO 2007/018164 is a configuration in which a signal input to each node is output in at least three directions (for example, signal input 9 is output in three directions of signal output 6, signal output 10 and signal output 11 in FIG. 15A), the scale of a matrix in the switch for switching paths increases and the number of links increases. Accordingly, the network of International Publication WO 2007/018164 does not meet the second requirement. Besides, as shown in FIG. 15C, the path from the cluster switch to the node C in normal operation is the path via the node F and a passage count of the optical switches is three times. At this time, when the link between the node C and the node F, is disconnected, a passage count of optical switches is four times in the path via the node E and the node B from the cluster switch to the node C as one of the alternative routes to the node C. That is, as the passage count of the optical switches increases in the alternative route, an effect which the loss of the optical switches has on a transmitted signal increases. Accordingly, the network of International Publication WO 2007/018164 does not meet the third requirement.

As the first to third requirements described above cannot be met by the related art noted, this related art has a problem, in that a transmission network with a transmission line that can be secured with certainty when an active signal line fails cannot be provided.

An object of the present invention is to solve the above-mentioned problem, provide an optical transmission system that inhibits expansion of the scale of an optical switch matrix in each node and the increase of the number of wires, and secure an alternative route in which the number of passed nodes is optimized.

The disclosed optical transmission system includes at least one ring network configured by plural nodes. Each node is provided with an optical switch having such a connection configuration that the output in at least two directions of a signal input to the node is allowed and the output of the optical switch functions as input to another node included in the plural nodes.

According to the present invention, expansion of the scale of the matrix in the optical switch of the node and the number of links are inhibited, and securing an alternative route in which the number of passed nodes is optimized is realized.

BRIEF DESCRIPTION OF THE DRAWINGS

FIGS. 1A and 1B show an example of the configuration of a network in an optical transmission system according to a first embodiment, with FIG. 1A showing a network link configuration, and FIG. 1B showing the configuration of an optical switch;

FIG. 2 shows an example of a node transit frequency in an active path and an alternative route in the first embodiment;

FIGS. 5A and 5B show an example of the configuration of a network in an optical transmission system according to a third embodiment, with FIG. 5A showing network wiring configuration, and FIG. 5B showing the configuration of an optical switch;

FIGS. 6A and 6B show an example of the configuration of a network in an optical transmission system according to a fourth embodiment, with FIG. 6A showing network link configuration, and FIG. 6B showing the configuration of an optical switch;

FIG. 7 shows an example of a node transit frequency in an active path and an alternative route in the fourth embodiment;

FIG. 9 shows an example of a node transit frequency in an active path and an alternative route in the fifth embodiment;

FIG. 10 shows another example of a node transit frequency in the active path and the alternative route in the fifth embodiment;

FIG. 12 shows another example of a node transit frequency in an active path and an alternative route in the sixth embodiment;

FIG. 13 shows an example of the configuration of a network in an optical transmission system according to a seventh embodiment;

FIGS. 15A to 15C are explanatory drawings for explaining requirements with which an optical transmission system should be provided, with FIG. 15A showing network wiring configuration, FIG. 15B showing the configuration of an optical switch, and FIG. 15C showing a path in normal operation and a route when failure occurs.

DETAILED DESCRIPTION OF THE PREFERRED EMBODIMENTS

Figure 1A:
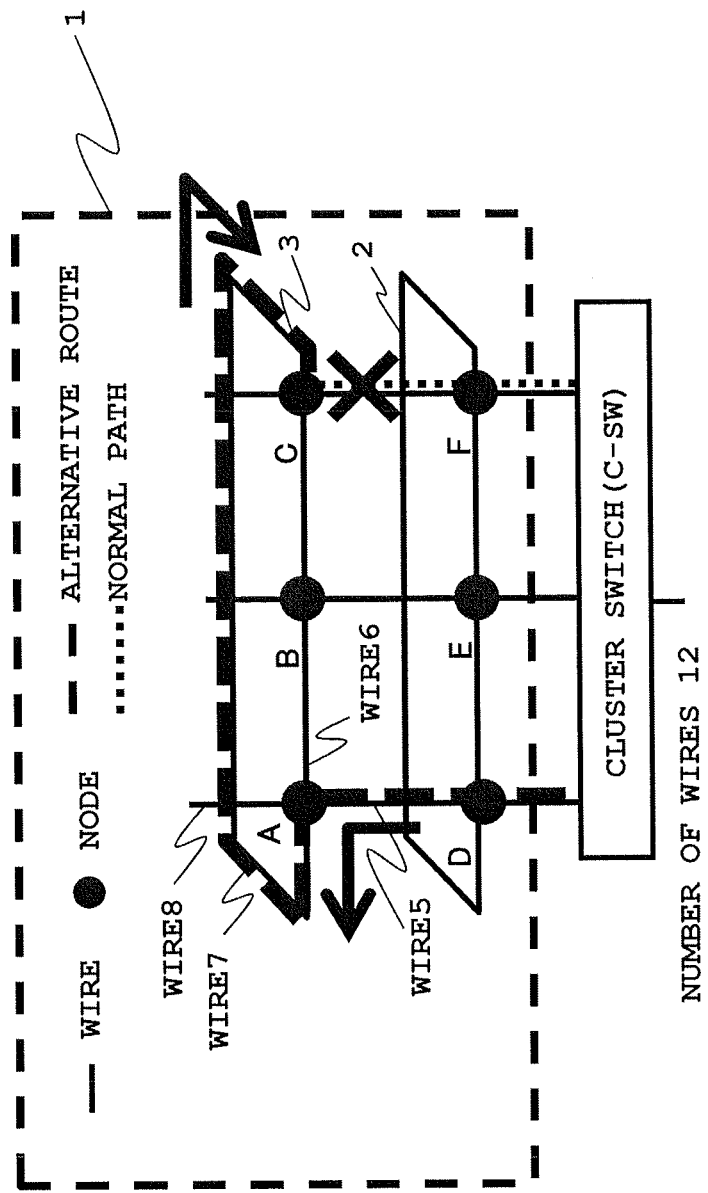

An optical transmission system described with reference to the embodiments mentioned below is an optical transmission system including at least one ring network configured by plural nodes. Each node is provided with an optical switch having such a connection configuration that the output in at least two directions of a signal input to the node is allowed and the output of the optical switch functions as input to another node included in the plural nodes. By way of such a configuration, the expansion of the scale of an optical switch matrix of each node and the increase of the number of links are suppressed, and an alternative route in which the number of passed nodes is optimized is realized.

The embodiments of the optical transmission system will be described referring to the drawings below. In the drawings, an optical fiber is used for an optical transmission medium. In the description, the same reference numeral is allocated to the same component shown in the drawings, and duplicate discussions are omitted.

First Embodiment

Referring to FIGS. 1A and 1B, the configuration of an optical transmission system in this embodiment will be described below. FIGS. 1A and 1B show the configuration of links in a transmission network 1 (network configuration) in this embodiment, and the scale of a matrix in an optical switch provided to each node.

This embodiment includes a cluster switch, which is an external connection interface and plural ring networks (in a frame shown by a dotted line) as shown in FIG. 1A. The first ring network 2 includes three nodes (D, E, F), the second ring network 3 also includes three nodes (A, B, C), and the nodes in each ring network are connected via a transmission line. As for connection between the ring networks, the nodes in each pair of A and D, B and E, and C and F are connected via a transmission line. The three nodes (D, E, F) that configure the first ring network 2 are connected to the cluster switch.

In normal operation, access from the cluster switch to the node A is made in a path via the node D. Access from the cluster switch to the node B is made in a path via the node E, access from the cluster switch to the node C is made in a path via the node F, access from the cluster switch to the node D is made in a direct path, access from the cluster switch to the node E is made in a direct path, and access from the cluster switch to the node F is made in a direct path.

Next, failure in the access path to the node C (shown as x in FIG. 1A) will be considered. The path to the node C in normal operation is a path via the node F from the cluster switch. At this time, when wiring between the node C and the node F is disconnected, the cluster switch selects the path to the node D, in response to the detection of the disconnection of the wiring, for one of alternative routes to the node C, and access from the cluster switch to the node C is made in a path via the node D and the node A. At this time, the scale of a matrix in the optical switch provided to the node A is as shown in FIG. 1B. The scale of the matrix has only to have such an optical switch configuration that the output in only two directions of a wire 7 and a wire 8 of a signal input to the node A via a wire 5 is allowed. Similarly, the scale of a matrix in the optical switch provided to the node B has a configuration similar to the configuration shown in FIG. 1B, although numbers of links are different. The scale of a matrix in each optical switch provided to the nodes C, D, E, F also has a configuration similar to that shown in FIG. 1B, although numbers of links are different.

Next, a node transit frequency in an active path in normal operation and in an alternative route when failure occurs will be considered. As shown in FIG. 2, the path in normal operation from the cluster switch to the node C is a path via the node F, and a transit frequency of optical switches is three. When the wire between the node C and the node F is disconnected, one of the alternative routes from the cluster switch to the node C is a path via the node D and the node A, and a passage count of optical switches is four. Accordingly, in the case of the network wiring configuration shown in FIGS. 1A and 1B, a passage count of four must be considered when designing the transmission network.

According to this embodiment, as some or all nodes in the ring network form a pair with the plural or all the nodes in the ring network other than the abovementioned ring network, the nodes in the same pair are connected via the transmission line and the optical switch has a connection configuration such that the output in at least two directions of a signal input to the one node is allowed, a low-loss and general purpose optical switch can be applied as the optical switch installed in each node and required for switching operation, and a transmission network, in which the preliminary signal line can be secured as a switched destination with certainty, is provided.

As described above, as the optical switch provided to each node is configured so that the output in only two directions of an input signal is allowed, securing the path in normal operation and the alternative route when failure occurs can be realized using a low-loss and general purpose optical switch, in which the scale of the matrix is suppressed.

Second Embodiment

Figure 3:
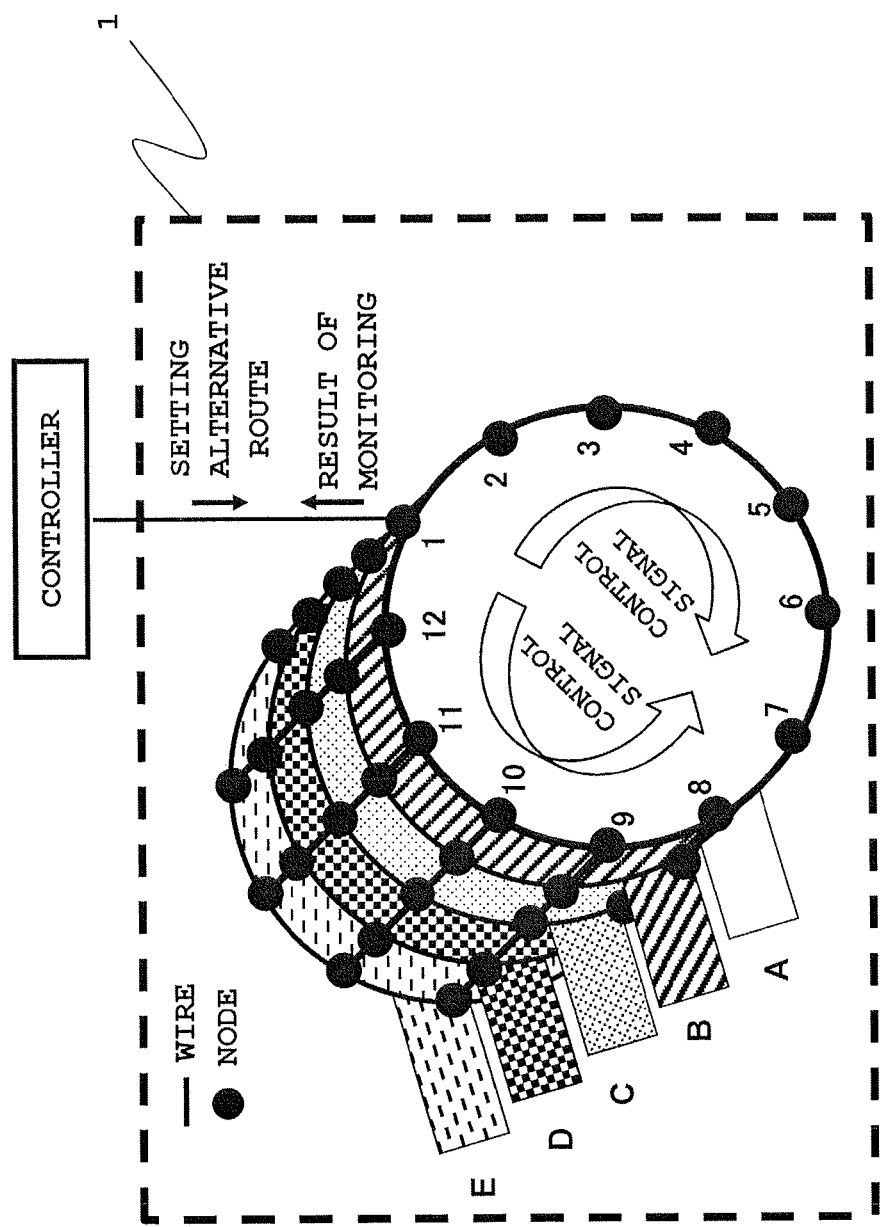
FIG. 3 shows an example of the configuration of a network in an optical transmission system according to a second embodiment.

Referring to FIG. 3, the configuration of a transmission network 1 in the second embodiment will be described. FIG. 3 shows the configuration of the transmission network when the number of nodes is not limited. An optical switch provided to each node is similar to that in the first embodiment.

As shown in FIG. 3, this embodiment shows plural ring networks A, B, C, D, E, with the number of nodes in each ring network being at least 12. In FIG. 3, a cluster switch is omitted. The nodes in the ring network are connected via a transmission line. Between the ring networks, each node forms a pair, as shown in FIG. 3, and the nodes in the same pair are connected via a transmission line. Each transmission line includes an active signal line, a preliminary signal line, and a control signal line.

A controller is connected to the node 1 in the ring network A as shown in FIG. 3. The controller integrates a result of monitoring a situation of each transmission line in each node using the control signal lines, and issues a switched destination instruction to each node in view of the situations of the transmission lines. In the ring network, the result of monitoring or information of the switched destination instruction is transmitted using the clockwise control signal line and the counterclockwise control signal line as shown in FIG. 3, and each node shares the information. In this way, this embodiment can cope with multiple failures on the transmission lines. Between the ring networks, the result of monitoring or the information of the switched destination instruction is also transmitted using the control signal line as shown in FIG. 3, and the ring networks share the information.

Figure 4:
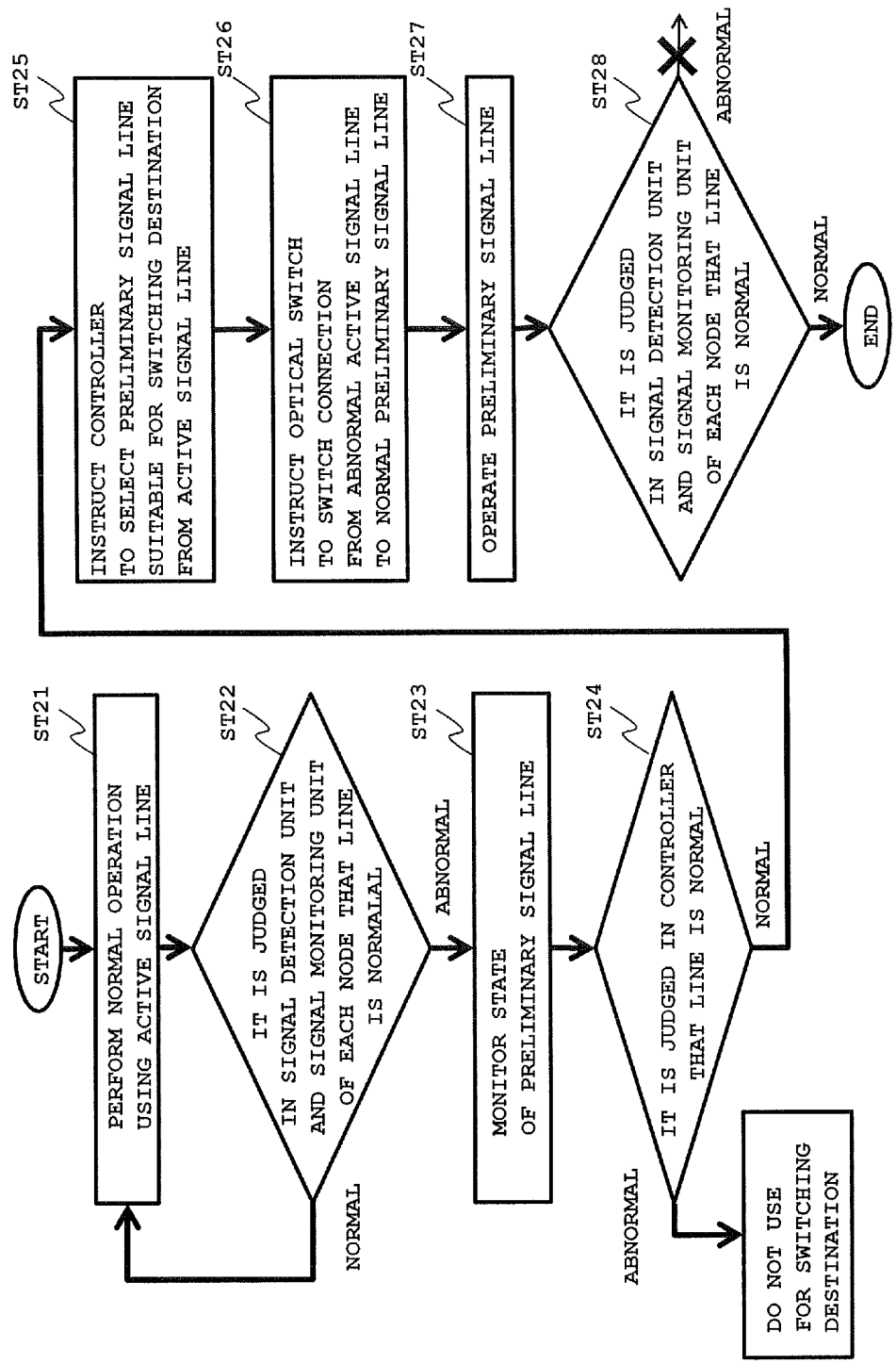
FIG. 4 is a flowchart showing a switching operation by a controller.

Next, a switching operation in the transmission network configured as described above will be described. FIG. 4 is a flowchart showing a switching operation in the transmission network in the second embodiment. A normality confirmatory operation of a redundant path corresponding to an operation path will be described below.

An operation path including an active signal line by a switching device of each node is normally operated (step ST21), normality/abnormality is judged in a signal detection unit and a signal monitoring unit of each node in a normality confirmatory operation of the operation path, and the controller is notified of a result of the judgment (step ST22). At this time, when the result of the judgment is normality, normal operation on the operation path (step ST21) is continued. When abnormality is identified, the node which is identified as abnormal transmits a monitoring signal to a preliminary signal line and monitors a state of the preliminary signal line (step ST23). Concretely, in a normality confirmatory operation of the preliminary signal line by the switching device, the node which is identified as abnormal first transmits a monitoring signal to the preliminary signal line to select a redundant path corresponding to the operation path (in a case that plural preliminary signal lines exist). According to the monitoring signal transmitted to the preliminary signal line, monitoring is performed in each node (step ST24). The normality of the preliminary signal line is judged in the controller that receives results of monitoring in each node, and the preliminary signal line which is identified as normal is selected as a switched destination from the abnormal operation path (step ST25). Next, according to the controller, an optical switch is connected to the preliminary signal line (step ST26). As described above, operation by the preliminary signal line is started (step ST26) and normality/abnormality is judged in the signal detection unit and the signal monitoring unit of each node (step ST27). At this time, as the normality of the preliminary signal line is confirmed before switching, the preliminary signal line is never identified as abnormal, the operation by the preliminary signal line is necessarily judged normal (step ST28), and the switching operation is finished.

As described above, according to this embodiment, as the monitoring signal is transmitted to the preliminary signal line beforehand and its state can be monitored, the normality of the redundant path using the preliminary signal line can be confirmed before failure occurs in the operation path and switching is executed, and double failure that the preliminary signal line for functioning as a protection is not normally operated can be prevented when failure occurs in the operation path.

According to this embodiment, as the optical switch has a connection configuration such that the output in at least two directions (the active path by the active signal line and the redundant path by the preliminary signal line) of a signal input to one node is allowed, the optical transmission system with plural preliminary signal lines is provided as a switching destination, the preliminary signal line, the normality of which is confirmed, is selected out of the plural preliminary signal lines, and the preliminary signal line can be secured as the switching destination.

This embodiment provides an optical transmission system where the signal detection unit and the signal monitoring unit, respectively provided to each node, share the information of a result of monitoring a state of the preliminary signal line by a monitoring signal using a control signal transmitted in the control signal line when the active signal line is turned unusable in the transmission network connected by the active signal line, the preliminary signal line, and the control signal line. Accordingly, switching from the active signal line to the preliminary signal line is performed between the plural nodes with the nodes interlocked, even if switching of the path is required in the plural nodes to secure the transmission path, and the switching operation can be completed in short time.

Moreover, according to this embodiment, as sharing the information acquired by monitoring between the nodes in one ring network or plural ring networks is performed by executing in the two counterclockwise and clockwise directions and between or among the ring networks using the control signal line, the information of a result of monitoring a situation of the paths, including the information specifying a location of failure in the line, is shared among units provided with the optical switch installed in the respective nodes, and the operation of the optical switch in the respective nodes is switched according to the switching destination instruction based upon situation monitoring results with each operation interlocked, and an optical transmission system, where operation for switching to the alternative path based upon the results of monitoring is also securely completed without disconnecting a control signal in the case of complex failure, such as the disconnection of plural fibers, is provided.

Further, according to this embodiment, as the plural nodes connected by the active signal line, the preliminary signal line, and the control signal line, and the transmission system including the nodes include at least the ring network or a mesh network (each node has three or more-direction paths), an optical transmission system with a reliable and safe transmission path can be secured in a network in which a station and homes are star-connected, such as Fiber To The Home (FTTH) and an equipment link network, such as a data center.

As the optical transmission system described above is configured so that output in only two directions of the active signal line and the preliminary signal line of an input signal to the optical switch provided to each node is allowed, the two paths, including the path in normal operation and the alternative route when failure occurs, can be realized using a low-loss and general purpose optical switch having a matrix scale which is suppressed.

Third Embodiment

Figure 5B:
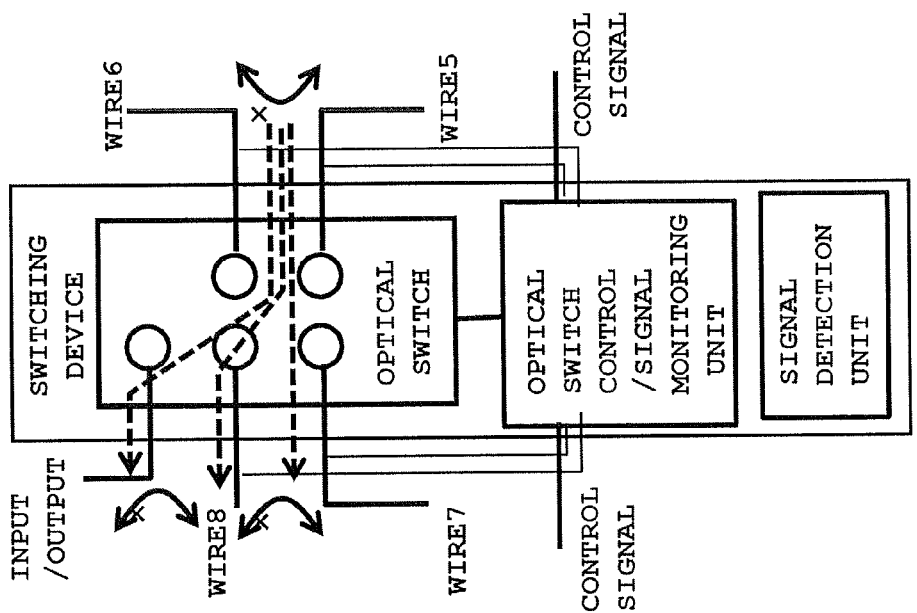

Referring to FIGS. 5A and 5B, the configuration of a transmission network in the third embodiment will be described. FIGS. 5A and 5B show the link configuration of the transmission network and the scale of a matrix in an optical switch provided to each node.

This embodiment includes a cluster switch, forming an external connection interface, and multiple ring networks (in a dotted frame) as shown in FIG. 5A. The first ring network includes three nodes (D, E, F). The second ring network also includes three nodes (A, B, C), and the nodes in each ring network are connected via a transmission line. Connection between the ring networks is provided by each node pair A and D, B and E, and C and F, and the nodes in the pairs are connected via a transmission line. Connection with the cluster switch is made between the cluster switch and any of the three nodes (D, E, F) included in the first ring network.

A rack where multiple servers are housed is provided to each node as shown in FIG. 5A, and server information (information transmitted/received to/from the server connected to another node by the server) is input/output via an input-output signal line that connects the node and the server.

An optical switch, an optical switch control/signal monitoring unit, and a signal detection unit are provided to each node as shown in FIG. 5B. The optical switch enables access to the server provided to each node (switching from a wire 5 to an input-output wire) in addition to the switching of paths (switching from the wire 5 to a wire 7 or switching from the wire 5 to a wire 8).

The optical switch control/signal monitoring unit controls the optical switch based upon link monitoring information in the signal detection unit. The optical switch control/signal monitoring unit is connected to each node via a control signal line.

Accordingly, this transmission network can be applied to an access network, like a business area network, such as a data center including a metropolitan area network, and wiring in a residential area, such as Fiber To The Home (FTTH).

Fourth Embodiment

Figure 6B:
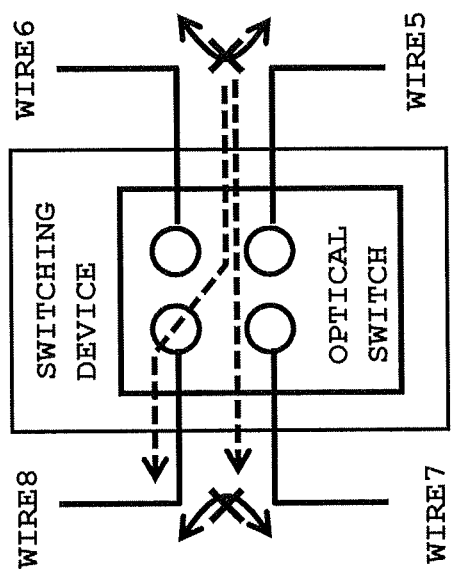

Referring to FIGS. 6A and 6B, the configuration of a transmission network in the fourth embodiment will be described. FIGS. 6A and 6B show the wiring configuration of the transmission network and the scale of a matrix in an optical switch provided to each node.

This embodiment includes a cluster switch, forming an external connection interface, and plural ring networks (in a dotted frame) as shown in FIG. 6A. The first ring network includes three nodes (D, E, F). The second ring network also includes three nodes (A, B, C), and the nodes in each ring network are connected via a transmission line. Connection between the ring networks is provided by each node pair D and B, and C and E in each ring network, and the nodes in the pair are connected via a transmission line. Connection with the cluster switch is made between the cluster switch and any of the three nodes (D, E, F) included in the first ring network and between the cluster switch and the node A in the second ring network.

In normal operation, access is made from the cluster switch to the node A. Access from the cluster switch to the node B is made via the node D, access from the cluster switch to the node C is made via the node E, access from the cluster switch to the node D is directly made, access from the cluster switch to the node E is directly made, and access from the cluster switch to the node F is directly made.

Next, failure (shown as x in FIG. 6A) in the access path to the node C will be discussed. The path from the cluster switch to the node C in normal operation is a path via the node E. At this time, when a link between the node C and the node E is disconnected, one of the alternative routes to the node C is a route via the node A. At this time, the scale of a matrix in the optical switch provided to the node A is as shown in FIG. 6B. That is, the optical switch has only to configured so that the output in only two directions of the link 7 and the link 8 of a signal input to the node A via the link 5 is allowed. Similarly, the scale of a matrix in the optical switch provided to the node B is also as shown in FIG. 6B. The scale of a matrix in each optical switch provided to the nodes C, D, E, F is also as shown in FIG. 6B.

Next, the number of passed nodes in the active path in normal operation and in the alternative route when failure occurs will be discussed. As shown in FIG. 7, the path from the cluster switch to the node C in normal operation is a path via the node E, and a passage count of optical switches is three. At this time, when the wire between the node C and the node E is disconnected, an alternative route from the cluster switch to the node C is a route via the node A, and a passage count of the optical switches is three. Accordingly, in the case of the network link configuration shown in FIGS. 6A and 6B, the transmission network can be designed considering the passage count of the optical switches to be three.

As this embodiment is configured so that the output of a signal input to the optical switch provided to each node is allowed in only two directions, a route in which the number of passed nodes is minimized to suppress an optical switch passage count can be selected in both the operation path and in the alternative route using the low-loss and general purpose optical switch, the scale of the matrix of which is suppressed.

Fifth Embodiment

Figure 8:
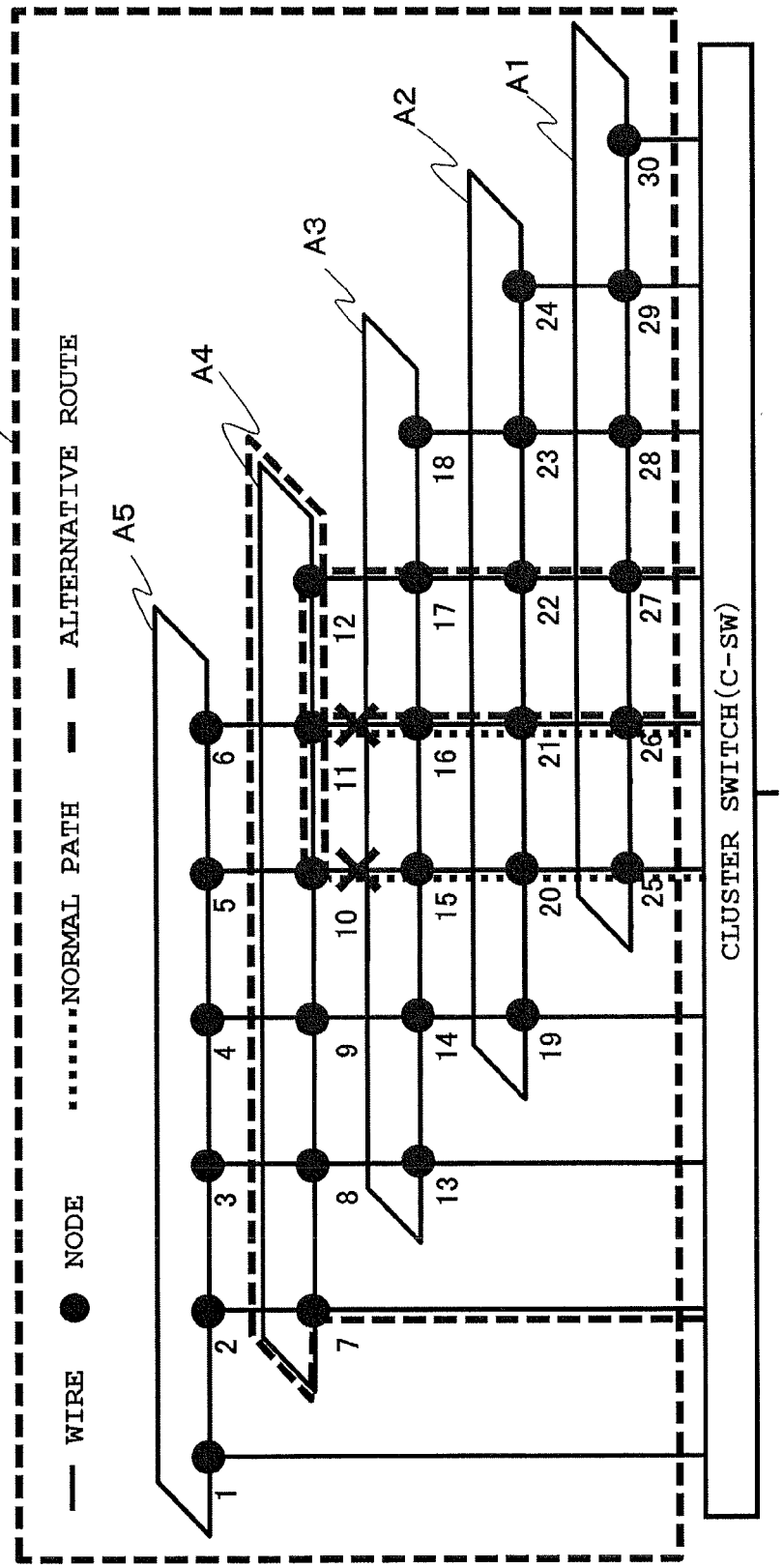
FIG. 8 shows an example of the configuration of a network in an optical transmission system according to a fifth embodiment.

Referring to FIG. 8, the configuration of a transmission network in the fifth embodiment will be described. In FIG. 8, the basic configuration is similar to those shown in FIGS. 1A, 1B, 6A and 6B, and this embodiment will be mainly described with respect to features different from those of FIGS. 1A, 1B, 6A and 6B.

This embodiment includes a cluster switch, which is an external connection interface, and multiple ring networks (in a dotted frame) as shown in FIG. 8. The ring network A1 includes six nodes (25, 26, 27, 28, 29, 30), the ring network A2 also includes six nodes (10, 20, 21, 22, 23, 24), the ring network A3 also includes six nodes (13, 14, 15, 16, 17, 18), the ring network A4 also includes six nodes (7, 8, 9, 10, 11, 12), and the ring network A5 also includes six nodes (1, 2, 3, 4, 5, 6). The nodes in each ring network are connected via a transmission line. As for connection between (among) each ring network, a node pair of the node 2 and the node 7, a node set of the node 3, the node 8 and the node 13, a node set of the node 4, the node 9, the node 14 and the node 19, a node set of the node 5, the node 10, the node 15, the node 20 and the node 25, a node set of the node 6, the node 11, the node 16, the node 21 and the node 26, a node set of the node 12, the node 17, the node 22 and the node 27, a node set of the node 18, the node 23 and the node 28 and a node pair of the node 24 and the node 29 are formed from the five nodes in each ring network, and the nodes in each pair (each set) are connected via each transmission line. Connection with the cluster switch is made between the cluster switch and the node 1 in the ring network A5, the node 7 in the ring network A4, the node 13 in the ring network A3, the node 19 in the ring network A2 or any of the six nodes (25, 26, 27, 28, 29, 30) in the ring network A1.

In normal operation, as shown in FIG. 9, an access path from the cluster switch to the node 10 is a path via the node 25, the node 20, and the node 15. Accordingly, the transit frequency of the nodes is five times.

Failure (shown as x in FIG. 8) in the access path between the node 15 and the node 10 will be discussed below. When a wire between the node 10 and the node 15 is disconnected, an alternative route 1 to the node 10 is a path via the node 26, the node 21, the node 16, and the node 11 from the cluster switch to the node 10, and a passage count of the nodes is six. An alternative route 2 to the node 10 is also conceivable. The alternative route 2 is a path via the node 7, the node 12, the node 11 from the cluster switch to the node 10, and a passage count of the nodes is five.

Accordingly, in the case of the network link configuration shown in FIG. 8, correspondence to the alternative route when failure occurs is enabled by designing the transmission network while considering the passage count of the optical switches provided to each node in normal operation.

Another example will be described below. In normal operation, as shown in FIG. 10, an access path from the cluster switch to the node 11 is a path via the node 26, the node 21, and the node 16 from the cluster switch to the node 11. Accordingly, a passage count of the nodes is five. At this time, when a wire between the node 11 and the node 16 is disconnected, an alternative route 1 to the node 11 is a path via the node 27, the node 22, the node 17, and the node 12 from the cluster switch to the node 11 and a passage count of the nodes is six. An alternative route 2 to the node 11, in addition to the abovementioned route, is conceivable. The alternative route 2 is a path via the node 7 and the node 12 from the cluster switch to the node 11, and a passage count of the nodes is four.

Accordingly, in the case of the network link configuration shown in FIG. 8, a path having a reduced signal loss can be selected as the alternative route, compared with the transit path of the optical switches provided to each node in normal operation.

As described above, in the design of the transmission network, if the number of ring networks and the number of nodes in the ring network are considered, transmission loss in the operation path or in the alternative route can be reduced.

Sixth Embodiment

Figure 11:
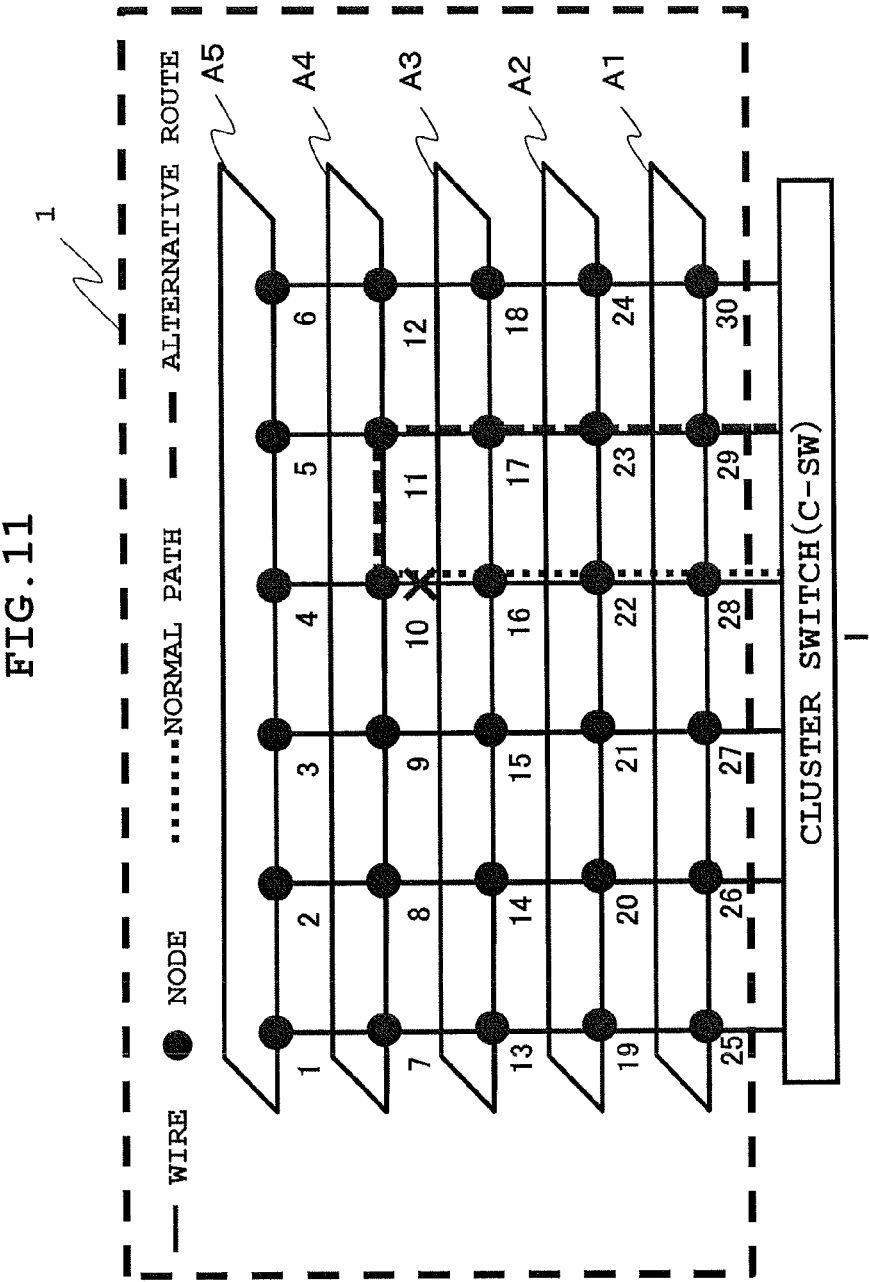
FIG. 11 shows an example of the configuration of a network in an optical transmission system according to a sixth embodiment.

Referring to FIG. 11, the configuration of a transmission network in the sixth embodiment will be described. In FIG. 11, the basic configuration is similar to that shown in FIGS. 1A and 1B, and this embodiment will be mainly described with respect to features different from those of FIGS. 1A and 1B.

This embodiment includes a cluster switch, which is an external connection interface, and plural ring networks (in a dotted frame) as shown in FIG. 11. The ring network A1 includes six nodes (25, 26, 27, 28, 29, 30). The ring network A2 also includes six nodes (19, 20, 21, 22, 23, 24), the ring network A3 also includes six nodes (13, 14, 15, 16, 17, 18), the ring network A4 also includes six nodes (7, 8, 9, 10, 11, 12), and the ring network A5 also includes six nodes (1, 2, 3, 4, 5, 6). The nodes in each ring network are connected via each transmission line. As for connection among each ring network, a node set of the node 1, the node 7, the node 13, the node 19 and the node 25, a node set of the node 2, the node 8, the node 14, the node 20 and the node 26, a node set of the node 3, the node 9, the node 15, the node 21 and the node 27, a node set of the node 4, the node, 10, the node 16, the node 22 and the node 28, a node set of the node 5, the node 11, the node 17, the node 23 and the node 29, and a node set of the node 6, the node 12, the node 18, the node 24 and the node 30 are formed out of all the nodes in each ring network, and the nodes in the set are connected via each transmission line. Connection with the cluster switch is made between the cluster switch and any of the six nodes (25, 26, 27, 28, 29, 30) in the ring network A1.

In normal operation, as shown in FIG. 12, an access path to the node 10 is a path via the node 28, the node 22 and the node 16 from the cluster switch to the node 10. Accordingly, a passage count of the nodes is five.

Failure (shown as x in FIG. 11) in the access path to the node 10 will be discussed below. At this time, when a wire between the node 10 and the node 16 is disconnected, an alternative route to the node 10 is a path via the node 29, the node 23, the node 17 and the node 11 from the cluster switch to the node 10 as shown in FIG. 12, and a passage count of the nodes is six.

When failure occurs in an access path to another node (7, 8, 9, 11, 12) in the ring network A4 to which the node 10 belongs, a passage count of the nodes in the alternative route when the failure occurs is six, compared with a passage count of the nodes in the path taken in normal operation of five.

Accordingly, in the case of the network link configuration shown in FIG. 11, correspondence to a signal transmitted in the alternative line when failure occurs is enabled by designing the transmission network considering a passage count of the optical switches acquired by adding one to the passage count of the optical switches provided to each node in normal operation.

Seventh Embodiment

Referring to FIG. 13, the configuration of a transmission network in the seventh embodiment will be described. In FIG. 13, the basic configuration is similar to that shown in FIG. 3, and this embodiment will be mainly described with respect to features different from those of FIG. 3.

This embodiment relates to a transmission network when the number of nodes is not limited. An optical switch provided to each node is similar to the optical switch in the second embodiment.

As shown in FIG. 13, this embodiment includes multiple ring networks A, B, C, D, E, and shows a case in which the number of nodes in each ring network is at least 12. In this embodiment, a cluster switch is omitted. The nodes in the ring network are connected via each transmission line. Among ring networks, as shown in FIG. 13, 11 nodes in the ring network form sets, and the nodes in the same set are connected via each transmission line. The transmission line includes an active signal line, a preliminary signal line and a control signal line.

Accordingly, as shown in FIG. 13, 16 nodes in total, including 12 nodes in the ring network A, one node in the ring network B, one node in the ring network C, one node in the ring network D and one node in the ring network E, are connected to a cluster switch.

As described above, access to the ring network E is enabled without passing the ring networks A, B, C, D. Similarly, access to the ring network D is enabled without passing the ring networks A, B, C, access to the ring network C is enabled without passing the ring networks A, B, and access to the ring network B is enabled without passing the ring network A.

Eighth Embodiment

Figure 14A:
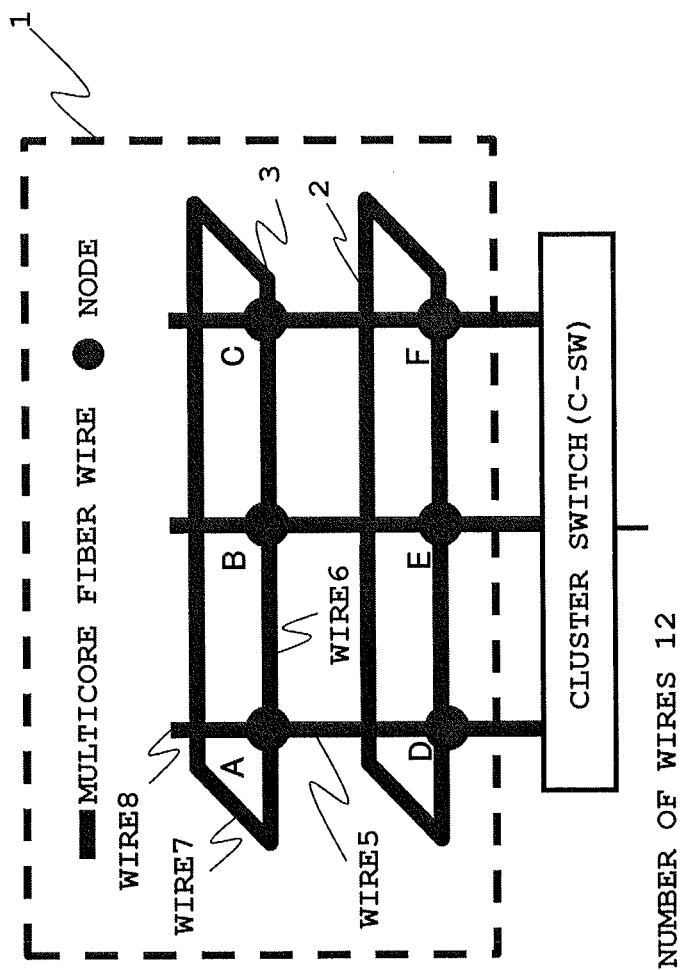
FIGS. 14A and 14B show an example of the configuration of a network in an optical transmission system according to an eighth embodiment, with FIG. 14A showing network link configuration, and FIG. 14B showing multicore fiber link.
Figure 14B:
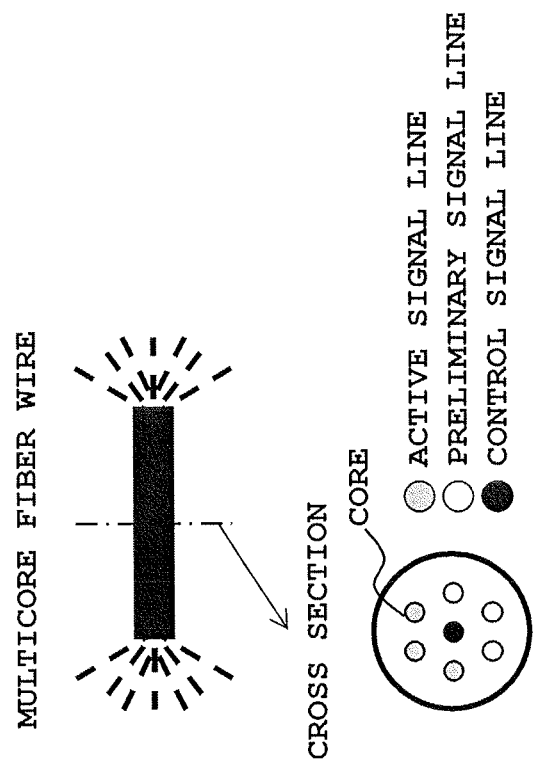
Figure 15A:
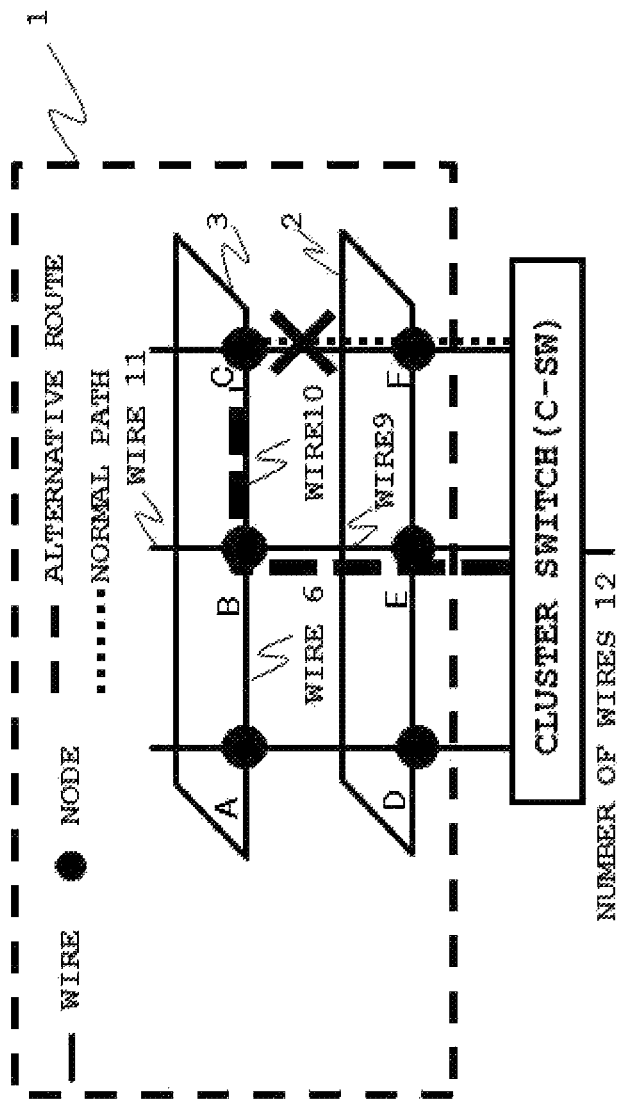
Figure 15B:
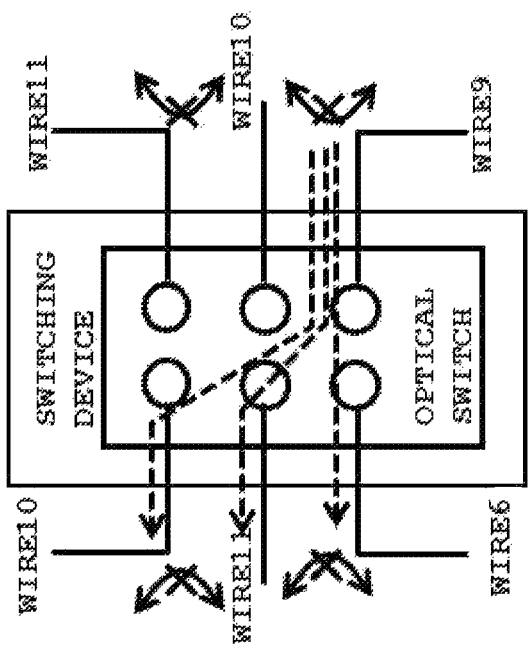

Referring to FIGS. 14A and 14B, the configuration of a transmission network in the eighth embodiment will be described. In FIGS. 14A and 14B, the basic configuration is similar to that shown in FIG. 1, and this embodiment will be mainly described with respect to features different from those in FIGS. 1A and 1B.

A multicore fiber can be used for an active signal line and a preliminary signal line, which are transmission lines that connect nodes. FIGS. 14A and 14B show a configuration in which three cores are allocated to the active signal line and three cores are allocated to the preliminary signal line, out of seven cores that configure the multicore fiber. The one residual core may be also allocated to a control signal line that connects an optical switch control/signal monitoring unit.

As described above, the multicore fiber can be used for the active signal line and the preliminary signal line that connect nodes.

An example having a signal transmitted and received between nodes has been described. However, the present invention is not limited to this example, and can be applied to an optical switch installed in each node of a network and a transmission network for transmitting/receiving a signal in the transmission network except between nodes.

What is claimed is:

1. An optical transmission system comprising:
   at least one ring network configured by a plurality of nodes,
   an optical switch provided for at least one of the nodes having a connection configuration such that output in at least two directions of a signal input to the at least one node is allowed, and
   a controller, wherein
   the output of the optical switch functions as input to another node included in the plurality of nodes,
   at least some of the plurality of nodes form pairs with nodes in another ring network different from the at least one ring network,
   the nodes that form the pairs are connected via at least one transmission line,
   the at least one transmission line includes an active signal line, a preliminary signal line, and a control signal line;
   an active path using the active signal line and an alternative route using the preliminary signal line are provided,
   when the active signal line is unavailable, the active signal line is switched to the alternative route,
   the controller is connected to the ring network,
   the controller transmits a result of monitoring by the at least one node, including a situation of each transmission line between each node in counterclockwise and clockwise directions of the ring network and between the ring network and other ring networks using the control signal line,
   the optical switch of the node shares the transmitted result of monitoring; and
   the optical switch switches the connection configuration according to an alternative route setting from the controller based upon the transmitted result of monitoring.

2. The optical transmission system according to claim 1, wherein the at least one transmission line is configured of a multicore fiber.

* * * * *